Sept. 24, 1968     F. A. BOWER, JR     3,402,667
FLUID POWER TRANSFER APPARATUS
Filed April 3, 1967                                                      2 Sheets-Sheet 1
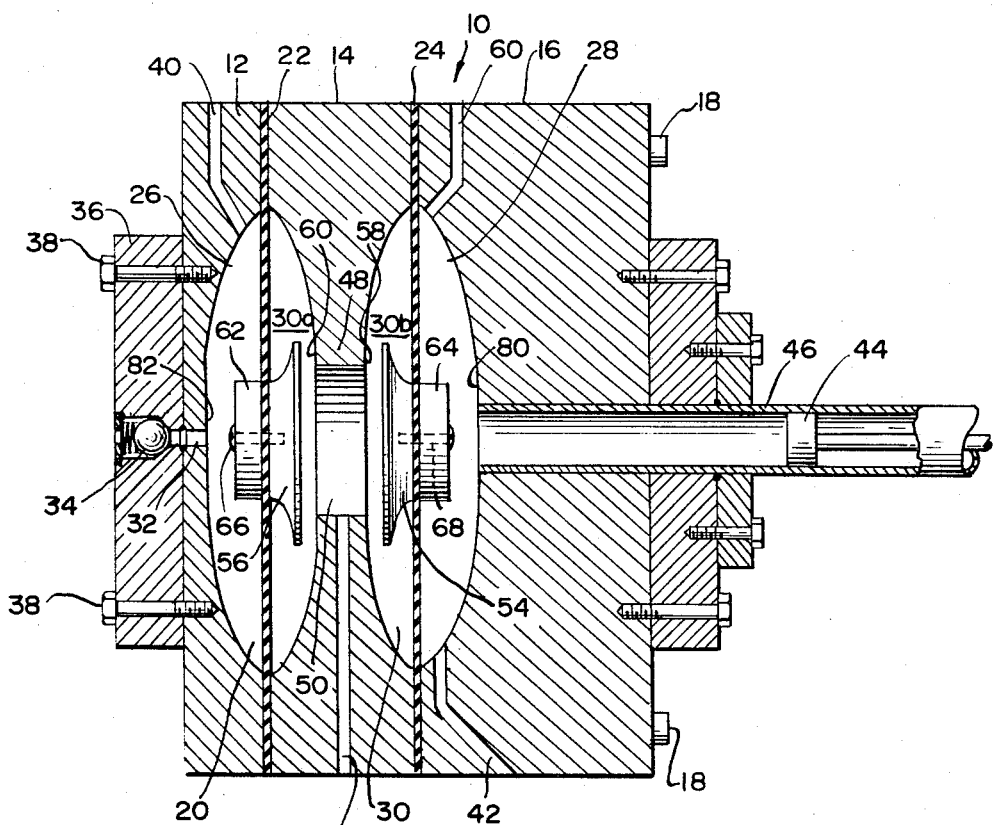
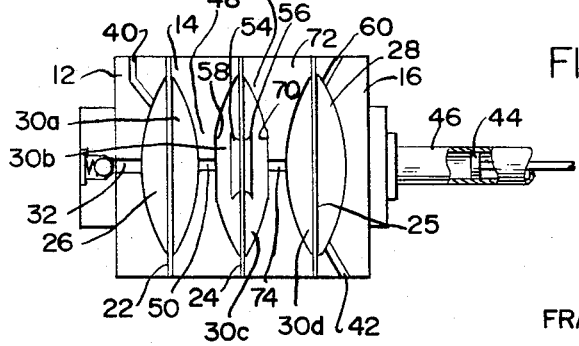
INVENTOR
FRANK A. BOWER JR.
BY *Pitherbridge, O'Neill & Aubel*
ATTORNEYS Sept. 24, 1968  F. A. BOWER, JR  3,402,667
FLUID POWER TRANSFER APPARATUS
Filed April 3, 1967  2 Sheets-Sheet 2

INVENTOR
FRANK A. BOWER JR.
BY Petherbridge, O'Neill & Aubel.
ATTORNEYS.

United States Patent Office 3,402,667
Patented Sept. 24, 1968

3,402,667
FLUID POWER TRANSFER APPARATUS
Frank A. Bower, Jr., Chicago, Ill., assignor to Panther Pumps & Equipment Co., Inc., Chicago, Ill., a corporation of Illinois
Continuation-in-part of application Ser. No. 542,545, Apr. 14, 1966. This application Apr. 3, 1967, Ser. No. 643,768
21 Claims. (Cl. 103—44)

ABSTRACT OF THE DISCLOSURE

A fluid power transfer apparatus divided into chambers by a diaphragm wherein a fluid force is applied to one surface of the diaphragm in order to transmit the force to the opposite surface of the diaphragm. The diaphragm of the apparatus is protected against excessive wear or damage by a valve positioned in at least one of the chambers which responds to pressure changes in one of the chambers to limit diaphragm movements. The apparatus can utilize two or more diaphragms to provide at least one intermediate chamber between that wherein the force is applied and that wherein the force is utilized. Pressure responsive valves are also used in conjunction with these latter systems to limit diaphragm life. Each such apparatus is designed for the employment of modularized diaphragm and valve components to enhance interchangeability and replacement.

---

This application is a continuation-in-part of my copending application Ser. No. 542,545, filed Apr. 14, 1966, for "Fluid Transfer Apparatus."

Heretofore, the diaphragms of prior art diaphragm type pumps and motors were susceptible to breakage or damage in the event pressure on either side of the diaphragm increased to an extent sufficient to move the diaphragm beyond the limits of movement for which the diaphragm was designed to operate. Such pressure increases could be caused, for example, by blockage in the inlet or outlet lines of the chamber of the fluid being pumped. Quite often the diaphragm would "extrude" into the outlet line.

Pressure responsive valve arrangements were employed in the prior art to provide means for assuring that the pressure in the pumped fluid chamber was maintained within limits to prevent such damage to the diaphragm. These valves, however, were located in the pumped fluid lines and, in those cases where the pumped fluid was abrasive or corrosive to metal, the pumped fluid would eventually deteriorate the materials of the valves, thus requiring periodic replacement of valves and valve parts which could only be accomplished through the expenditure of considerable time and effort and resulted in substantial and expensive lost time delays.

Moreover, these valves were slow acting and would not shut off the pump or motor in the short period of time required to minimize the possibility of damage to the diaphragm.

With the present invention, these problems and difficulties of the prior art, among others, are substantially overcome by the provision of a pressure control system for a diaphragm pump or motor including at least a pair of diaphragms having a predetermined volume of fluid therebetween which are responsive to the pressure conditions in the chambers for both the pumped fluid and the pumping fluid, and a valve carried by one of the diaphragms for the pumped fluid and the pumping fluid, and a valve carried by one of the diaphragms for quick and positive response to pressure changes in said chambers to minimize the possibility of damage to the diaphragm in contact with the pumped fluid. Modularized construction of diaphragm pump components to permit them to be readily replaced in the event of damage has also enhanced the utility of the fluid transfer apparatus of the invention.

It is therefore, an object of the present invention to provide new and improved fluid transfer apparatus, such as diaphragm pumps and motors.

It is another object of the present invention to provide new and improved fluid transfer apparatus of the diaphragm type employing a quick acting, positive valve arrangement for preventing damage to the pumping diaphragm of the transfer apparatus.

Still another object of the present invention is to provide a pressure responsive control system responsive to pressure conditions in the pumped fluid chamber of a diaphragm pump or motor for controlling movement of the diaphragm.

A further object of the present invention is to provide a pressure responsive valve control system responsive to pressure conditions in the pumped fluid chamber of a diaphragm pump or motor and which includes a valve arrangement which is not in direct contact with the pumped fluid.

A still further object of the present invention is to provide a new and improved pressure responsive valve control system for a diaphragm pump or motor, said system including a pair of diaphragms with a predetermined volume of fluid between the diaphragms and a valve head carried by one of the diaphragms in a location where the valve head is not in contact with the pumped fluid of the pumped fluid chamber thereby to prevent contact of the pumped fluid with the valve.

It is another object of the invention to utilize a modularized type of construction for diaphragm and valve components which will permit a simple and fast means for substituting pump components to reduce the otherwise substantial and expensive pump down time for maintenance and repair.

Another object of the present invention is to provide a pressure responsive valve control system for a diaphragm pump or motor which permits removal of air from a location in the high pressure area of the pumping fluid chamber thereby to enhance the mechanical efficiency of the pump or motor.

These and other objects, features and advantages of the present invention will become readily apparent from a careful consideration of the following detailed description, when considered in conjunction with the accompanying drawing illustrating preferred embodiments of the present invention, wherein like reference numerals refer to like or corresponding parts, and wherein:

FIGURE 1 is a vertical section through a diaphragm pump illustrating the principles of the present invention;

FIGURE 2 is a generally schematic illustration in vertical section of a second embodiment of the present invention;

Figure 3:
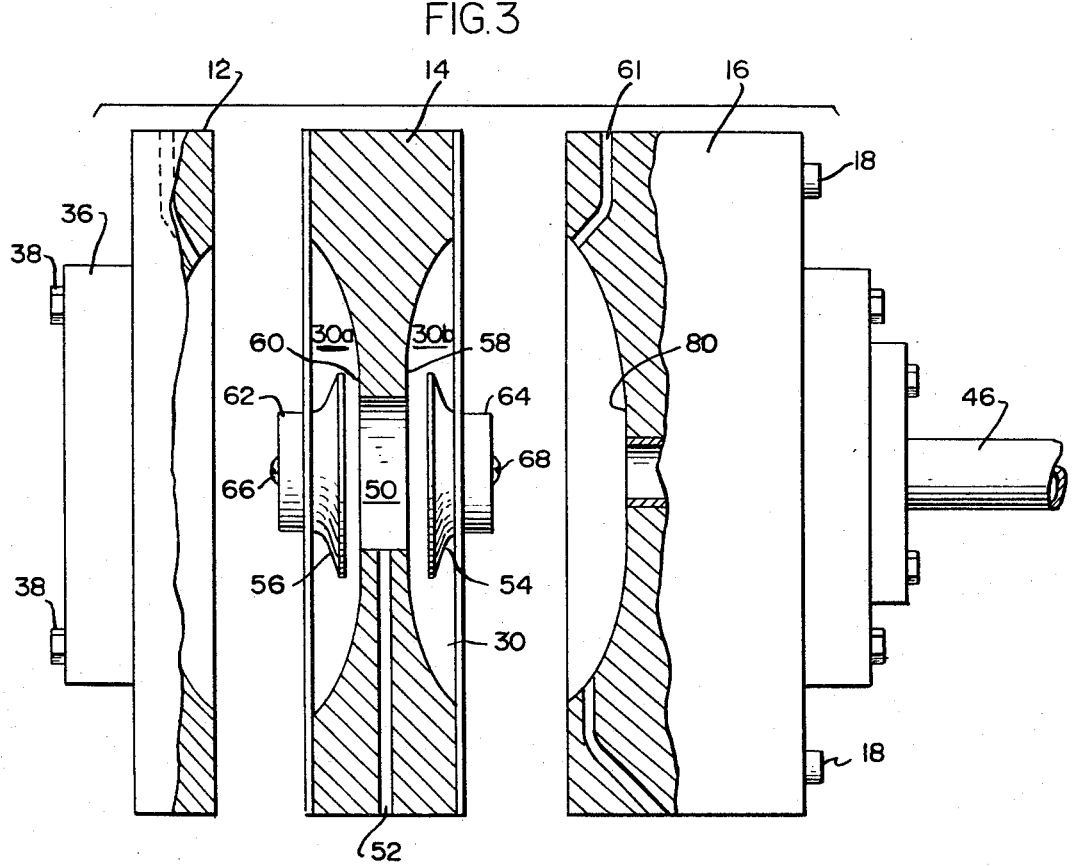
FIGURE 3 is an exploded vertical sectional view of the diaphragm pump of FIGURE 1 illustrating the modular construction of the diaphragm element.

Although the present invention has a variety of applications, a suitable environment, therefore, appears in FIGURE 1 and takes the form of a diaphragm pump 10, such as that disclosed in copending application Ser. No. 417,537, filed Dec. 11, 1964.

The pump 10 comprises three body sections 12, 14 and 16 which are secured together as by bolts 18. As can best be seen in FIGURE 3, the pump is designed with a modularized construction with sections 12, 14 and 16 being separable upon removal of bolts 18.

When the pump is assembled, the sections 12, 14 and 16 define a cavity, indicated generally by the numeral 20, which is divided by a pair of spaced diaphragms 22 and 24 into three chambers, a pumped fluid chamber 26, a pumping fluid chamber 28 and a chamber 30 which is intermediate chambers 26 and 28, for purposes hereinafter more fully described.

Prior to the assembly of the body sections 12, 14 and 16 by bolts 18, it can be seen, as shown in FIGURE 3, that the central body section 14 is a modular or one-piece section to which diaphragms 22 and 24 have been previously secured in a conventional manner, such as by bonding. In the utilization of modularization of pump elements, as shown, the assembly of pumps 10 during manufacture is expedited, but the replacement of worn, damaged or broken elements of the pump in the field is greatly enhanced. Therefore, the replacement of the entire central body section, diaphragms and pressure responsive valves can be effected in the field with only an inconsequential down time loss due to pump repairs. The modular construction also makes possible the sale and storage of modular pump elements, and particularly the diaphragm portion thereof, in units whereby a user can purchase the whole preassembled diaphragm component from a distributor. This eliminates a multitude of problems relating to questions of diaphragm weight and dimension, relative flexibility, valve dimensions and attachment means.

Fluid to be pumped is introduced into the pumping chamber 26 through an inlet passageway 32 and past a one-way check valve 34 seated in a collar 36 secured, as by bolts 38, to the housing section 12. From the chamber 26, fluid is pumped under the influence of the diaphragm 22 through the outlet passageway 40.

Pumping fluid, such as oil, is introduced into the pumping fluid chamber 28 through an inlet passageway 42. The action of a piston 44 reciprocated in a cylinder 46 which communicates with chamber 28 provides the pumping action on fluid in chamber 28.

In addition to the spaced diaphragms 22 and 24, the pressure responsive valve control system of the present invention includes the chamber 30 which is divided into a pair of compartments, compartments 30a and 30b, by an internal wall 48 defined by the housing section 14. The wall 48 of the modular body section 14 is shown centrally bored, as at 50, to establish communication between compartments 30a and 30b.

Compartments 30a and 30b are filled with a noncompressible fluid which may be introduced into these compartments through a passageway 52 communicating with the bore 50. The quantity of fluid in chamber 30 is preferably maintained volumetrically constant; however, this quantity may be varied to provide a metering valve arrangement discussed more fully hereinafter.

In addition to the diaphragm 22 and 24, chamber 30 and the fluid in chamber 30, the pressure responsive valve control system of the present invention includes a pair of valve heads, one of which, a valve head 54, is carried by the diaphragm 24 and the other of which, a valve head 56, is carried by the diaphragm 22. The valve head 54 is carried by the diaphragm 22 in a normally open position and in a position to close the bore 50 by seating on a valve seat 58, whereas, the valve 56 is carried by the diaphragm 24 in a position to close the bore 50 by seating on a valve seat 60. Both valve seats 58 and 60 may be formed, as shown in FIGURE 1, on the wall 48 with the entire structure being a single modular component.

The valve heads 54 and 56 are maintained in their positions on the respective diaphragms by collars 62 and 64 which are secured, as by screws 66 and 68 which extend through the diaphragms into the valve heads.

Thus, the valve heads 54 and 56 are movable from normally open to closed position to permit flow of fluid between compartments 30a and 30b.

It will be appreciated that neither of the valve heads 54 or 56 are located in the path of the fluid being pumped through chamber 26 and, therefore, if the pumped fluid passing through chamber 26 to metal or plaster, the pumped fluid is corrosive or abrasive it cannot act on the valve heads.

In operation, reciprocation of the piston 44 acts on the driving or pumping fluid in the chamber 28 to cause reciprocation of the diaphragm 24, reciprocable movement of the fluid in chamber 30 between compartments 30a and 30b through the bore 50 and reciprocation of the diaphragm 22 to pump pumped fluid through chamber 26.

If for any reason the pressure in the pumping fluid chamber 28 should exceed a predetermined pressure level, pressure forces will move the diaphragm 24 to the left, if a predetermined maximum pressure is reached, the diaphragm 22 will move to a position where the valve head 54 seats on the valve seat 58 to prevent flow between compartments 30a and 30b. After seating of the valve 54, the pressure in compartment 30a and thus on the diaphragm 22 will not increase further and the diaphragm 22 will not be subjected to further pressure increase which might break, damage or extend the diaphragm into the outlet 40. Thus, effective means are provided by the present invention for preventing pressure in the pumping fluid chamber 28 from acting on the diaphragm 22 if the pressure in chamber 28 exceeds a predetermined level.

If for any reason the pressure in the pumped fluid chamber 26 should exceed a predetermined pressure level, the diaphragm 22 will be moved to the right, as viewed in FIGURE 1. If a predetermined maximum pressure is reached, such movement of the diaphragm 22 to the right will continue until the valve head 56 engages the valve seat 60 to prevent flow between compartments 30a and 30b whereby the pressure in chamber 26 is not thereafter transmitted to the fluid in compartment 30b or to the pumping fluid chamber 28. Thus undesirable pressures in the pumped fluid chamber 26 can be prevented from affecting unduly the operation of the pumping fluid chamber 28. It will be observed, therefore, that, with the present invention, simple and effective precalibrated valve means is provided for minimizing the possibility of damage to the pumping diaphragm (diaphragm 22) which might be caused by pressure increases in either the pumped fluid chamber 26 or pumping fluid chamber 28.

Moreover, the present invention provides new and improved means for positioning the valve means in a location which is not in contact with the fluid being pumped to prevent corrosion or abrasion of valve parts, if the pumped fluid, such as certain paints, is of that nature.

Another feature of the present invention resides in utilization of the pressure responsive valve control system of the present invention in association with an air removal system for a pumping fluid chamber 28 of a diaphragm pump or motor, such as the diaphragm pump or motor of FIGURE 1.

As shown in FIGURE 1, the air removal system comprises an outlet passageway 61 adjacent the top of the chamber 28 in a location where air, if any, would be trapped during operation of the pump or motor.

Air may be entrained in the pumping fluid when introduced into the pumping fluid chamber 28 or may be introduced from other external sources. Air being compressible will, when introduced into the pumping fluid chamber 28, reduce or impair considerably the mechanical efficiency of such pumps or motors.

Heretofore, unsuccessful efforts have been made to remove air from pumping fluid chambers at what is called the "low pressure" side of the chamber, e.g., from a location in the piston cylinder 46, rather than from the "high pressure" side of the pumping fluid chamber adjacent the pumping diaphragm. Removal of air from the "low pressure" side of the pumping fluid chamber has been largely ineffective, primarily because the majority of the air is entrained in the pumping fluid in this area of the pumping fluid chamber.

The present invention provides effective means for removing air from the pumping fluid chamber and then from advantageous positions where such air would accumulate in the pumping fluid chamber adjacent the top of the chamber.

Under some circumstances, it may be desirable to vary the calibration of the pressure responsiveness of the diaphragms 22 and 24 so that the valves 54 and 56 will seat to close the house 50 under different pressure limits depending upon the use of the pump. For this purpose, the inlet 52 for chamber 30 may be utilized to introduce different volumes of fluid in chamber 30. Thus, chamber 30 with a predetermined volume of fluid therein may be used for pumping of a particular material. Then, by changing the volume of the fluid in the chamber 30, the pump may be utilized for pumping a different material.

In FIGURE 2 is shown an alternative embodiment of the present invention wherein three spaced diaphragms 22 and 24 and a third diaphragm 25, rather than two diaphragms are employed and wherein a pair of valve heads carried by the diaphragm 24 only may be employed.

Figure 4:
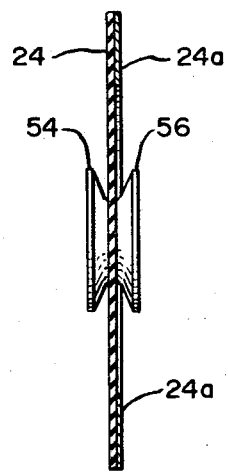
FIGURE 4 is a side elevation of a modularized form of a valve and diaphragm element of the invention.

FIG. 4 illustrates a modular element of the alternative embodiment of FIG. 2. In this instance, the middle diaphragm 24 is provided with a pair of valve heads, one being applied to each of the diaphragm faces. The diaphragm, as shown in FIG. 4, is provided with a gasket 24a. A pair of gaskets may be used, one adjacent each face of the diaphragm where required. This valved diaphragm 24 can be replaced by separating housing sections 14 and 75, placing diaphragm 24 therebetween and by joining the housing sections.

In keeping with the modularized concept of the invention, gasketed diaphragm 24 can be supplied individually or it can be supplied in combination with a pre-assembled unit consisting of diaphragm 22, housing section 14, valved diaphragm 24, housing section 75 and diaphragm 25. This preassembled unit complete with a noncompressible fluid in compartments 30a–d can thereby be readily connected between housing sections 12 and 16 as a substitute unit, or it can be employed as a replacement for the unit 22, 14 and 24 of FIG. 1 to provide an alternate pump unit.

The valve head 56 of the embodiment of FIG. 2 is not carried in the embodiment of FIGURE 2 by diaphragm 22 but rather is carried along with the valve head 54 by the diaphragm 24. The diaphragm 24 carries the valve head 56 in position for seating on a seat 70 formed by a wall 72 of a fourth housing section 75. The wall 72 is bored, as at 74, to communicate two additional compartments 30c and 30d of chamber 30 which in this embodiment has a different shape than chamber 30 of FIGURE 1. A noncompressible fluid fills compartments 30c and 30d as well as compartments 30a and 30b.

Thus, in the embodiment of FIGURE 2, if the pressure in the pumping fluid chamber 28 exceeds predetermined limits, the diaphragms 25 and 24 will be moved so that the valve head 54 will be seated on seat 58 and prevent fluid pressure of chamber 28 from further acting on the diaphragm 22. Conversely, if the fluid pressure in the pumped fluid chamber 26 exceeds predetermined limits, the diaphragms 22 and 24 will be moved so that the valve head 56 will be seated on the seat 70 to prevent pressure in the pumped fluid chamber 26 from acting on the pumping fluid in the chamber 28. Use of this pressure responsive valve control system of FIGURE 2 is particularly advantageous, when pumping highly corrosive or abrasive material which would affect the materials of construction of the valves, because the diaphragm 22 does not carry a valve head.

The third diaphragm 25 and compartments 30c and 30d are employed for effective utilization of the air removal outlet 60, but if air removal from the pumping fluid chamber is not a signficant problem, diaphragm 25 and the fluid in the compartments 30c and 30d could be eliminated.

It will also be appreciated that various other arrangements of valves located on the three diaphragms 22, 24 and 25 with valve seats 58 and 60 and with other valves and valve seats on wall 70 or adjacent the inlets 80 and 82 could be effectively utilized for controlling the effects of undesired pressure increases in the pumped fluid chamber and the pumping fluid chamber on the pump.

It will, therefore, be appreciated that the present invention provides a new and improved pressure responsive valve control system for diaphragm pumps and motors with or without added features of valve corrosion and abrasion protection, air removal, and variable pressure response limits of the valve control system.

The pressure responsive valve control system of the present invention can be considered a "designator," i.e., one diaphragm controls or "designates" the movement of the other diaphragm.

Moreover, by use of a colored fluid in the chamber between the diaphragms, a diaphragm leak indicator may be conveniently provided for indications of leaks in connection with either the diaphragm adjacent the pumped fluid chamber or the diaphragm adjacent the pumping fluid chamber.

Although minor modifications and alterations of the present invention will become readily apparent to those versed in the art, it should be understood that what is intended to be encompassed within the scope of the patent warranted herein are all such embodiments as reasonably and properly come within the scope of the contribution to the art hereby made.

I claim:

1. In a fluid power transfer apparatus including a housing defining a cavity, a first diaphragm secured in the cavity and dividing the cavity into a first pumped fluid chamber and a second fluid chamber, a second diaphragm secured in the cavity between the first diaphragm and a wall defining the cavity, the second diaphragm providing a third fluid chamber separated from the second fluid chamber, one of the diaphragms being disposed to transmit fluid pressure generated forces to the other of the diaphragms through at least one passage in the second fluid chamber, valve means positioned completely outside the passage and between the first and second diaphragm, the valve means being responsive to pressure conditions in at least one of the chambers for limiting the distance of movement of one of the diaphragms to minimize wear and damage of such diaphragm.

2. In fluid power transfer apparatus including a housing defining a cavity separated by a first diaphragm into a first pumped fluid chamber and a second fluid chamber and having fluid inlets and outlets for said chambers, valve means in said second chamber and responsive to pressure conditions in at least one of said chambers for limiting the distance of movement of said diaphragm to thereby minimize wear and of and damage to said diaphragm, said valve means including a second diaphragm disposed in said cavity, said second diaphragm being spaced from said first diaphragm and defining with said first diaphragm a third chamber located between said first and second chambers for receiving a predetermined volume of noncompressible fluid, and includes a valve head carried by said second diaphragm for controlling flow of fluid in said third chamber in response to pressure conditions in at least one of said chambers.

3. The apparatus of claim 2, wherein said second chamber is a pumping fluid chamber.

4. The apparatus of claim 3, wherein said valve means includes a wall disposed in said housing and separating said third chamber into first and second fluid compartments, and a port in said wall for flow of fluid between said first and second compartments, said valve head carried by said second diaphragm being carried in a position to control flow of fluid through said port whereby movement of said diaphragm in response to pressure conditions in at least one of said chambers causes opening or closing of said port by said valve head.

5. The apparatus of claim 4 including an inlet passageway to said third chamber for supply of fluid to said chamber.

6. The apparatus of claim 5, wherein said passageway is connected with said port.

7. The apparatus of claim 4, wherein said wall carries a valve seat for said valve head and said valve head is responsive to increases in pressure in said pumping fluid chamber to close said port.

8. The apparatus of claim 4, wherein said valve means includes a second valve head carried by said first diaphragm in said third chamber for controlling flow of fluid through said port in response to increases in pressure in said pumped fluid chamber.

9. The apparatus of claim 7, wherein said valve means includes a second valve head carried by said first diaphragm in said third chamber for controlling flow of fluid through said port in response to increases in pressure in said pumped fluid chamber.

10. The apparatus of claim 4, wherein said valve means includes a second wall in said housing for separating said third chamber into third and fourth compartments, a port in said second wall for flow of fluid between said third and fourth compartments, and a second valve head carried by said second diaphragm in a position to control flow of fluid through said second port, said second valve head closes said second port in response to pressure increases in said second chamber and said second valve head closes said second port in response to pressure increases in said first chamber to thereby prevent damage to said first diaphragm.

11. The apparatus of claim 8 including a third diaphragm disposed in said third chamber in spaced relation to said second diaphragm, said third diaphragm defining with said second diaphragm a fourth chamber for receiving a predetermined volume of noncompressible fluid, said third diaphragm and last mentioned fluid being provided to transmit pressure forces from said second chamber to said second diaphragm.

12. The apparatus of claim 10 including a third diaphragm disposed in said third chamber in spaced relation to said second diapragm, said third diaphragm defining with said second diaphragm a fourth chamber for receiving a predetermined volume of noncompressible fluid, said third diaphragm and last mentioned fluid being provided to transmit pressure forces from said second chamber to said second diaphragm.

13. The apparatus of claim 4, wherein said valve head is disc-shaped and said walls are contoured to provide valve seats for said valve heads.

14. The apparatus of claim 4, wherein said housing comprises four sections and each of said diaphragms is secured in a chamber by a pair of said sections.

15. The apparatus of claim 3, wherein said pumping fluid chamber is provided with an air removal outlet adjacent the second diaphragm and the top of the chamber.

16. A module for a fluid power transfer apparatus comprising a housing having a chamber, a first diaphragm secured adjacent one end of the housing in communication with and enclosing one end of the chamber, a second diaphragm secured adjacent another end of the housing in communication with and enclosing another end of the chamber, one of the diaphragms being disposed to transmit fluid pressure generated forces to the other of the diaphragms through at least one passage, valve means positioned completely outside the passage and between the first and second diaphragms for limiting the distance of movement of at least one of the diaphragms to minimize wear of and damage to the diaphragms whereby the module may be readily installed as a unit in the fluid power transfer apparatus.

17. A module for a fluid power transfer apparatus comprising a housing having a chamber, the chamber of the housing including enlarged end portions connected by a passage, a first diaphragm secured adjacent one end of a housing in communication with and enclosing one end of the chamber, a second diaphragm secured adjacent another end of the housing in communication with and enclosing another end of the chamber, valve means in the chamber disposed between the first and second diaphragms for limiting the distance of movement of at least one of the diaphragms to minimize wear of and damage to the diaphragm whereby the module may be readily installed as a unit in a fluid power transfer apparatus, the valve means being connected to and actuated by one of the diaphragms to close the passage interconnecting the enlarged end portions at a predetermined pressure condition in the chamber, the valve means being disposed outside the passage.

18. The module of claim 17, wherein the walls of the chamber at opposite ends of the passage provide a pair of spaced valve seats, valve means are connected to each of the diaphragms and are actuated thereby in response to predetermined pressure conditions in the chamber to close the passage by seating on the valve seat to minimize diaphragm wear and damage.

19. A module for a fluid power transfer apparatus comprising a housing having a chamber, a first diaphragm secured adjacent one end of the housing in communication with and enclosing one end of the chamber, a second diaphragm secured adjacent another end of the housing in communication with and enclosing another end of the chamber, a third diaphragm is interposed between the first and second diaphragms of the housing, the third diaphragm being secured within the housing and separating the chamber thereof into two separate chambers, valve means in the chamber disposed between the first and second diaphragms for limiting the distance of movement of at least one of the diaphragms to minimize wear of and damage to the diaphragm whereby the module may be readily installed as a unit in a fluid power transfer apparatus.

20. The module of claim 19, wherein the chamber of the housing includes enlarged end portions, each end portion being disposed in communication with the chamber portion containing the third diaphragm by a passage, and means on the third diaphragm for selectively sealing one of the passages in response to a predetermined pressure condition within the chamber.

21. The module of claim 20, wherein the third diaphragm is provided with a pair of opposed valve means which are engageable with valve seat means provided on the portion of the housing defining the passage ends to permit the selective sealing of the passages.

References Cited

UNITED STATES PATENTS

| | | | |
|---|---|---|---|
| 2,303,597 | 12/1942 | Adelson | 103—44 |
| 2,496,711 | 2/1950 | Goddard | 103—44 |
| 2,545,857 | 3/1951 | Perkins et al. | 31—86 |
| 3,254,845 | 6/1966 | Schlosser. | |

ROBERT M. WALKER, *Primary Examiner.*